(12) United States Patent
Xu (10) Patent No.: US 11,029,014 B2
(45) Date of Patent: Jun. 8, 2021

(54) ILLUMINATOR WITH A RADIATOR

(71) Applicants: Yaoping Xu, Changzhou (CN); Changzhou KAISEN Photoelectricity Co., Ltd., Changzhou (CN)

(72) Inventor: Yaoping Xu, Changzhou (CN)

(73) Assignees: CHANGZHOU KAISEN PHOTOELECTRICITY CO., LTD., Changzhou (CN); Yaoping Xu, Changzhou (CN)

( * ) Notice: Subject to any disclaimer, the term of this patent is extended or adjusted under 35 U.S.C. 154(b) by 0 days.

(21) Appl. No.: 16/658,941

(22) Filed: Oct. 21, 2019

(65) Prior Publication Data

US 2021/0116121 A1    Apr. 22, 2021

(51) Int. Cl.
| | |
|---|---|
| *F21V 7/00* | (2006.01) |
| *F21V 29/76* | (2015.01) |
| *F21V 29/67* | (2015.01) |
| *F21K 9/275* | (2016.01) |
| *F21Y 103/20* | (2016.01) |
| *F21Y 115/10* | (2016.01) |

(52) U.S. Cl.
CPC .......... *F21V 29/763* (2015.01); *F21K 9/275* (2016.08); *F21V 29/677* (2015.01); *F21Y 2103/20* (2016.08); *F21Y 2115/10* (2016.08)

(58) Field of Classification Search
CPC ........ F21V 29/74; F21V 29/67; F21V 29/677; F21Y 2103/00; F21Y 2103/10; F21Y 2105/16; H01L 23/467; G02F 2201/36; G02F 2001/133328
See application file for complete search history.

(56) References Cited

U.S. PATENT DOCUMENTS

| | | | | |
|---|---|---|---|---|
| 2010/0264826 A1* | 10/2010 | Yatsuda | ................. | F21K 9/00 |
| | | | | 315/112 |
| 2013/0343044 A1* | 12/2013 | Kim | ..................... | F21S 9/03 |
| | | | | 362/183 |
| 2014/0049964 A1* | 2/2014 | McClure | ............... | B23P 15/26 |
| | | | | 362/249.06 |

FOREIGN PATENT DOCUMENTS

| CN | 202674955 U | 1/2013 |
|---|---|---|
| TW | M507652 | 9/2015 |

* cited by examiner

*Primary Examiner* — William J Carter
*Assistant Examiner* — Omar Rojas Cadima
(74) *Attorney, Agent, or Firm* — Muncy, Geissler, Olds & Lowe, P.C.

(57) ABSTRACT

An illuminator includes an upper shell, a lower shell, an LED array and at least one fan. The upper shell includes a first outlet portion extending downward and inward from an inlet portion. The inlet portion includes at least one entrance. The first outlet portion includes a row of vents. The lower shell is made of thermally conductive metal and includes primary radiator fins extending from an upper face of a substrate. The lower shell is connected to the upper shell to form a tubular structure. The LED array is connected to a lower face of the lower shell and includes light-emitting diodes. The at least one fan is inserted in the tubular structure, connected to the inlet portion, and aligned with the at least one aperture.

14 Claims, 9 Drawing Sheets

ILLUMINATOR WITH A RADIATOR

BACKGROUND OF INVENTION

1. Field of Invention

The present invention relates to illuminators and, more particularly, to an illuminator with a radiator.

2. Related Prior Art

The life of a light-emitting diode ("LED") is jeopardized due to poor dissipation of heat. To solve this problem, an LED illuminator can be equipped with fans as disclosed in Chinese Patent No. CN202674955U and Taiwanese Patent No. M507652 for example. However, the dissipation of heat produced by the LED illuminators particularly those used to promote the growth of plants is not satisfactory. Moreover, the structures of the LED illuminators are complicated.

The present invention is therefore intended to obviate or at least alleviate the problems encountered in prior art.

SUMMARY OF INVENTION

It is the primary objective of the present invention to provide an illuminator that effectively dissipates heat.

To achieve the foregoing objective, the illuminator includes an upper shell, a lower shell, an LED array and at least one fan. The upper shell includes a first outlet portion extending downward and inward from an inlet portion. The inlet portion includes at least one entrance. The first outlet portion includes a row of vents. The lower shell is made of thermally conductive metal and includes primary radiator fins extending from an upper face of a substrate. The lower shell is connected to the upper shell, thereby forming a tubular structure. The LED array is connected to a lower face of the lower shell and includes light-emitting diodes. The at least one fan is inserted in the tubular structure, connected to the inlet portion, and aligned with the at least one aperture.

In another aspect, the upper shell includes a second outlet portion extending downward and inward relative to the inlet portion and comprising a row of vents, and the first and second outlet portions are located on two opposite sides of the inlet portion.

In another aspect, the upper shell includes two connective portions each of which extends downward and outward to a corresponding one of the first and second outlet portions from the inlet portion.

In another aspect, the upper shell includes two extensive portions each of which extends from a corresponding one of the first and second outlet portions.

In another aspect, the lower shell includes two wings extending from two opposite sides of the substrate and connected to the extensive portions.

In another aspect, the substrate and the wings together provide a space to contain the LED array.

In another aspect, the lower shell includes a track extending on the upper face of the substrate and including a groove.

In another aspect, the lower shell includes radiator ribs extending on the upper face of the substrate.

In another aspect, each of the primary radiator fins includes secondary radiator fins formed on two opposite sides.

In another aspect, the inlet portion includes an intermediate section and two lateral sections extending upward and outward from two opposite sides of the intermediate section, and each of the connective portions extends between a corresponding one of the first and second outlet portions and a corresponding one of the lateral sections.

In another aspect, at least one of the lateral sections includes at least one entrance aligned with the at least one fan.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF PREFERRED EMBODIMENT

Referring to FIGS. 1 through 5, an illuminator includes a housing 1, several fans 6 and an LED array 5 according to a first embodiment of the present invention. The housing 1 includes two lateral plates 2, an upper shell 3 and a lower shell 4. The upper shell 3 is connected to the lower shell 4 to provide a tubular structure 10. The lateral plates 2 are attached to two opposite open ends of the tubular structure 10. The upper shell 3 is connected to the lower shell 4 by buckles or screws for example. Similarly, the lateral plates 2 are connected to the tubular structure 10 by buckles or screws.

Figure 1:
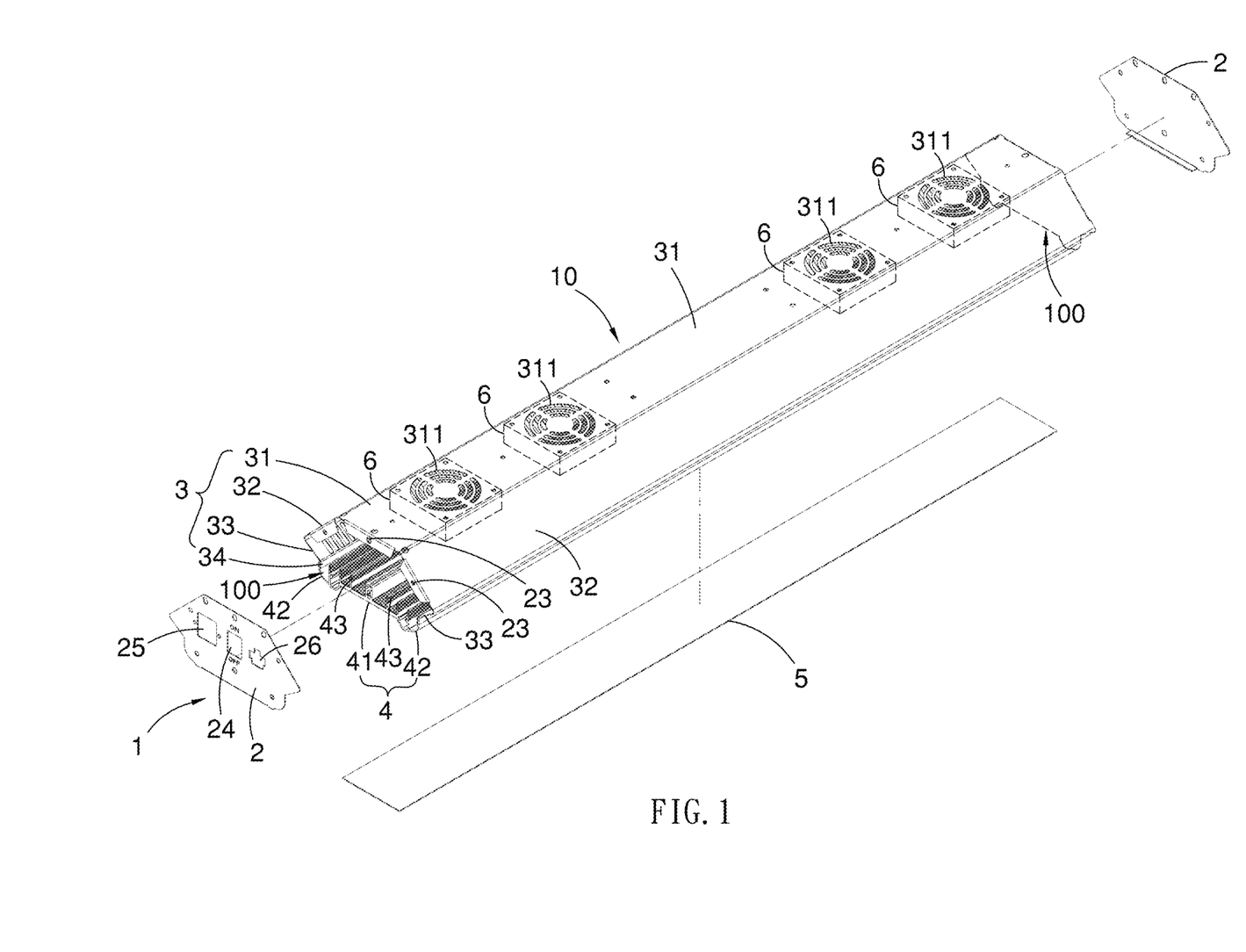
FIG. 1 is an exploded view of an illuminator according to the first embodiment of the present invention.
Figure 2:
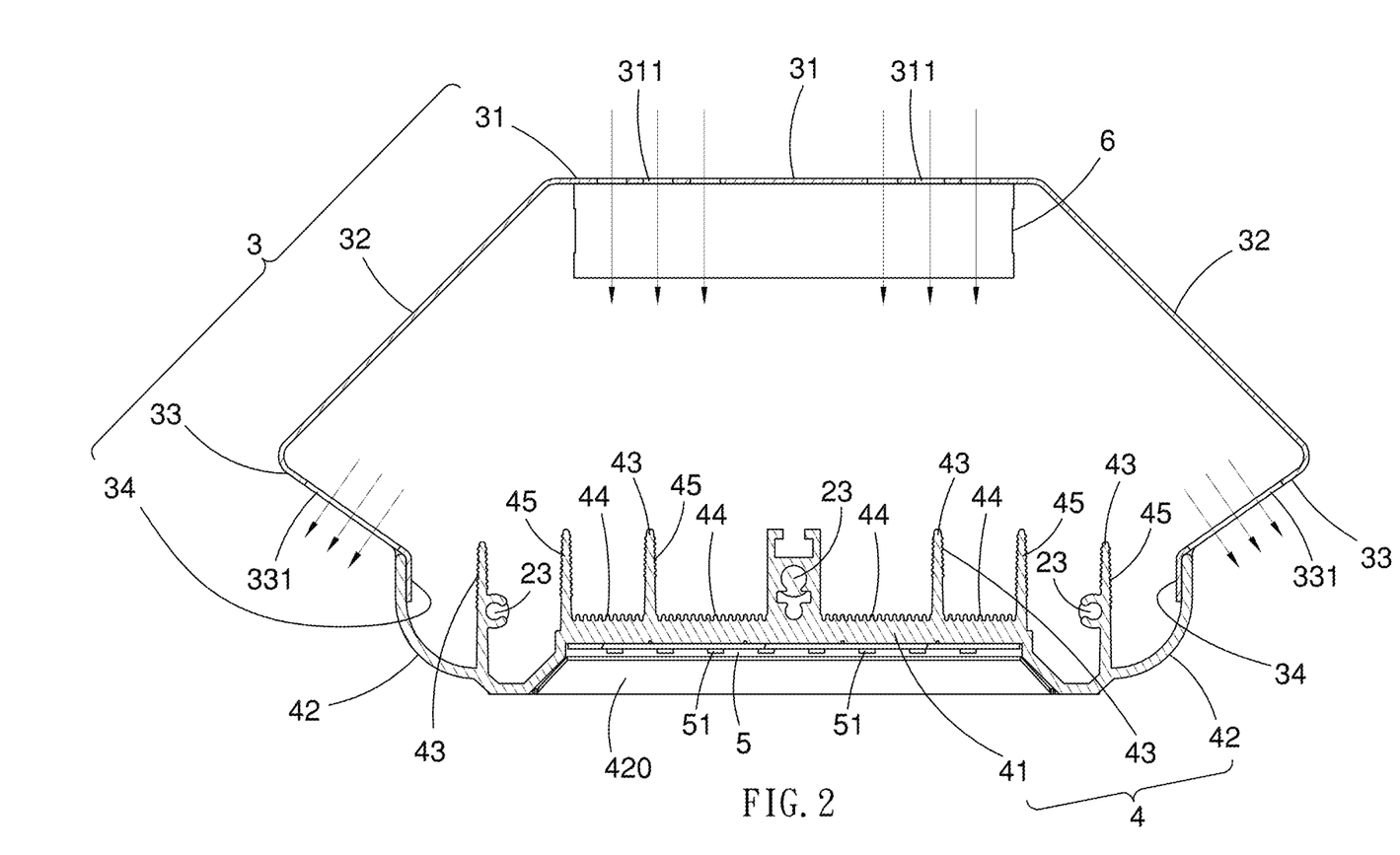
FIG. 2 is a cross-sectional view of the illuminator shown in FIG. 1.
Figure 3:
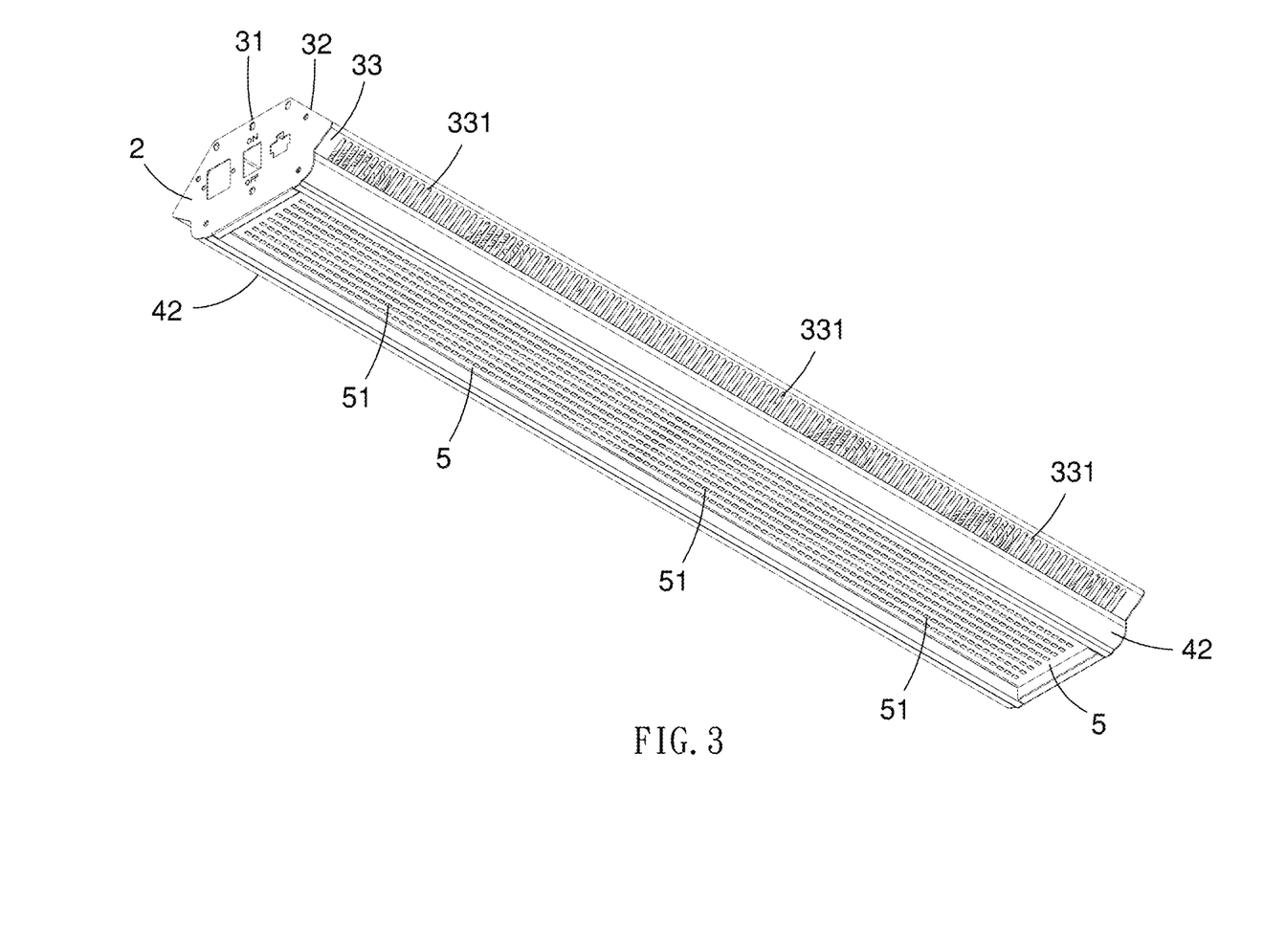
FIG. 3 is a perspective view of the illuminator of FIG. 1.
Figure 4:
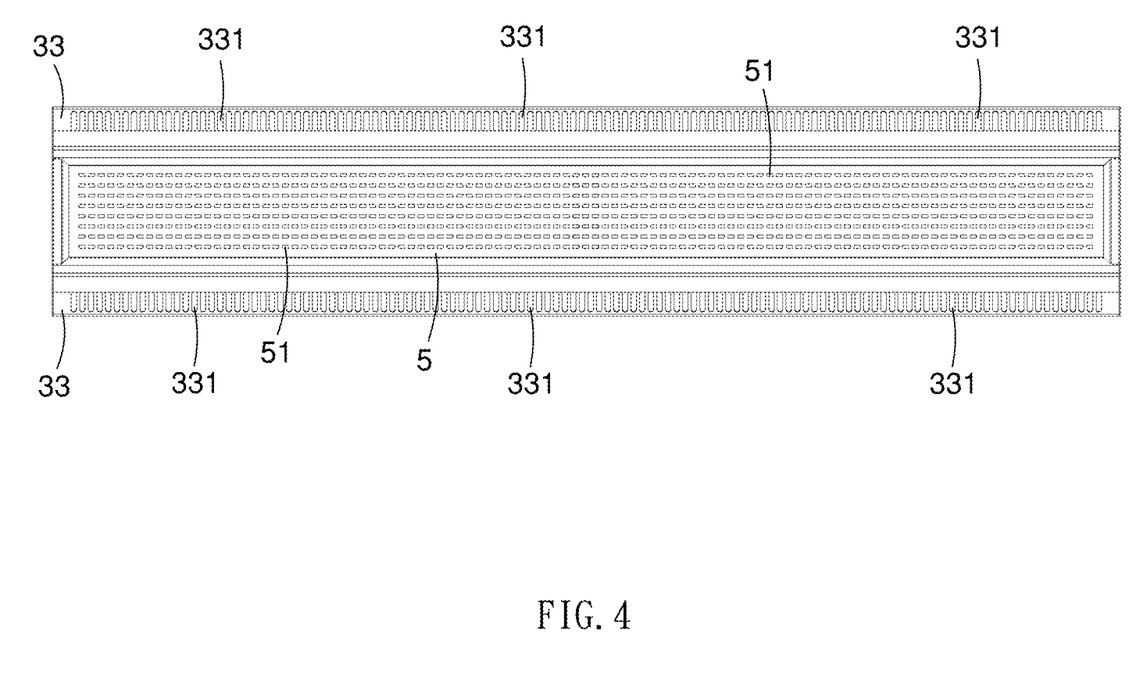
FIG. 4 is a bottom view of the illuminator shown in FIG. 1.

Referring to FIGS. 1 and 2, the upper shell 3 includes an inlet portion 31, two connective portions 32, two outlet portions 33 and two extensive portions 34. The connective portions 32 extend from two opposite edges of the inlet portion 31. Each of the outlet portions 33 extends from an edge of a corresponding one of the connective portions 32. Each of the extensive portions 34 extends from a corresponding one of the outlet portions 33. The outlet portions 33 will be referred to as the "first outlet portion" and the "second outlet portion" for clarity in the following description. The inlet portion 31 includes entrances 311. The fans 6 are located in and connected to the upper shell 3, below the inlet portion 31, corresponding to the entrances 311. The connective portions 32 extend downward and outward from the inlet portion 31. The outlet portions 33 extend downward and inward from the connective portions 32 (or the inlet portion 31). Referring to FIGS. 3 and 4, each of the outlet portions 33 includes vents 331 arranged along a length of the outlet portion 33. In the first embodiment, the upper shell 3 can be made of a single piece of metal or several pieces of metal connected to one another by welding for example.

Figure 5:
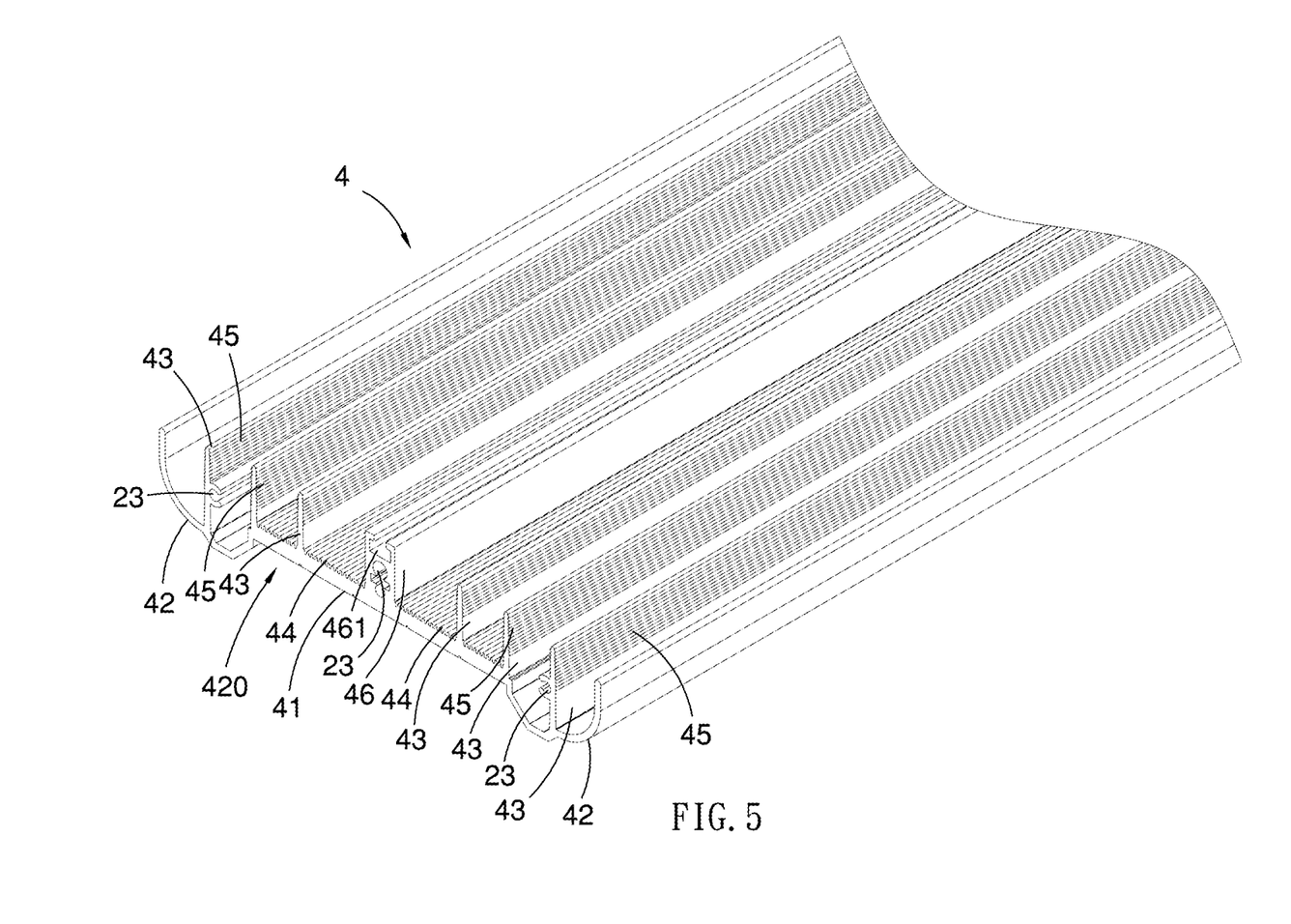
FIG. 5 is a partial perspective view of a lower shell of the illuminator depicted in FIG. 1.
Figure 6:
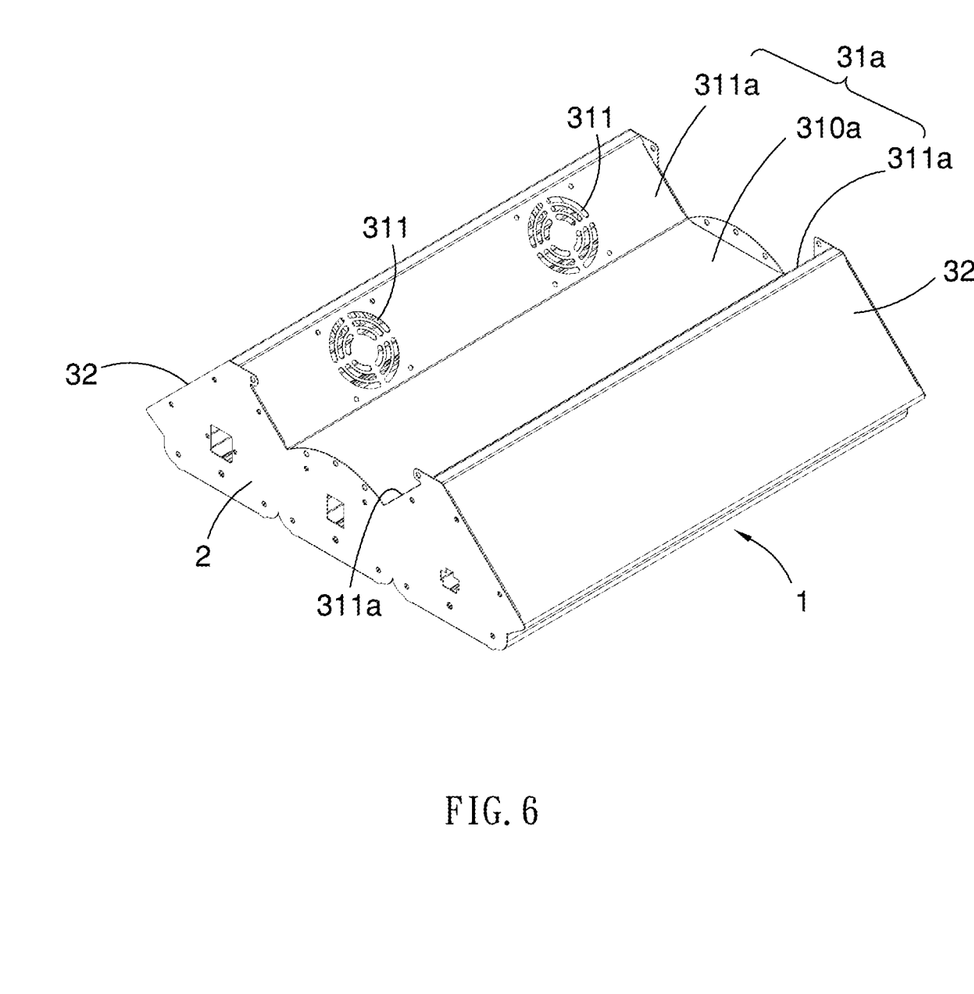
FIG. 6 is an exploded view of an illuminator according to the second embodiment of the present invention.
Figure 7:
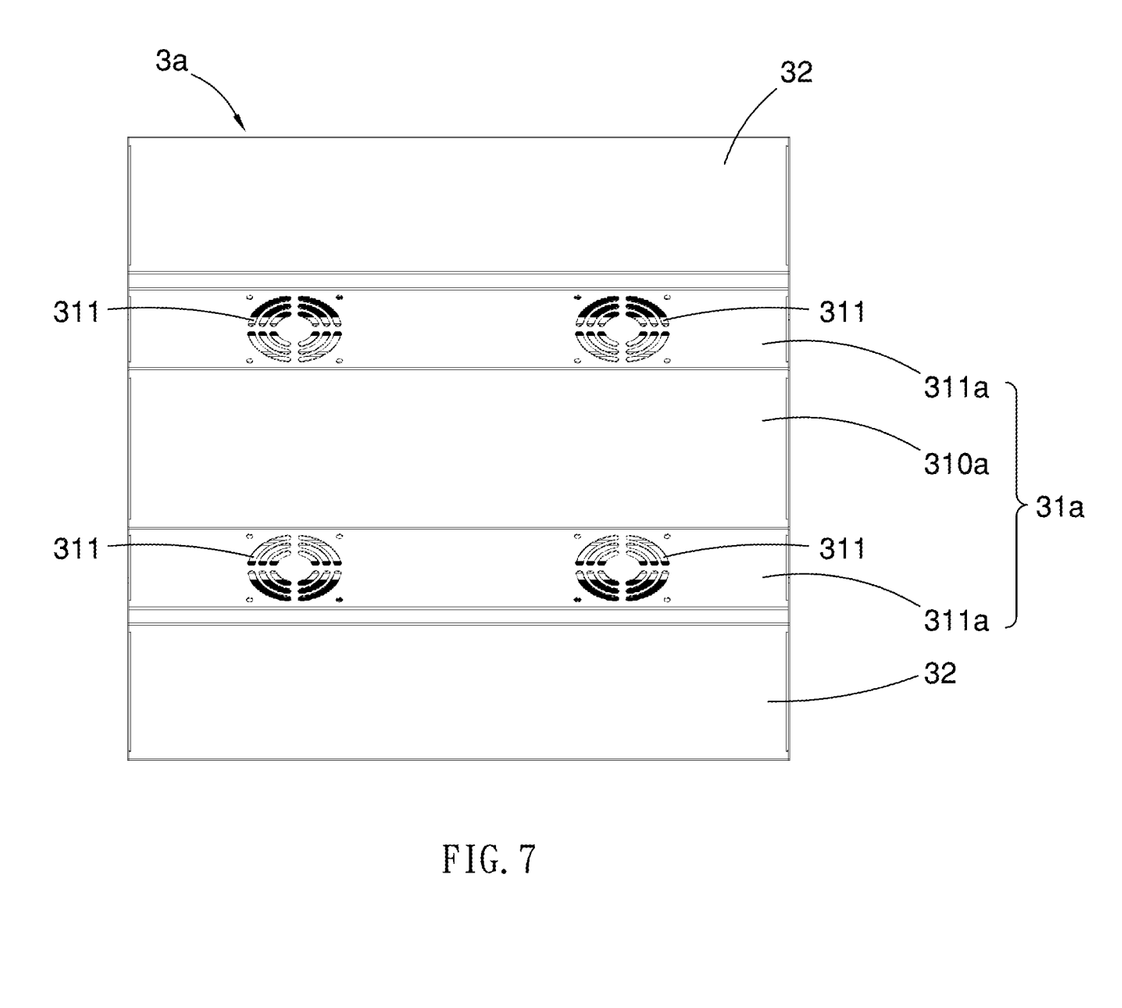
FIG. 7 is a top view of the illuminator shown in FIG. 6.
Figure 8:
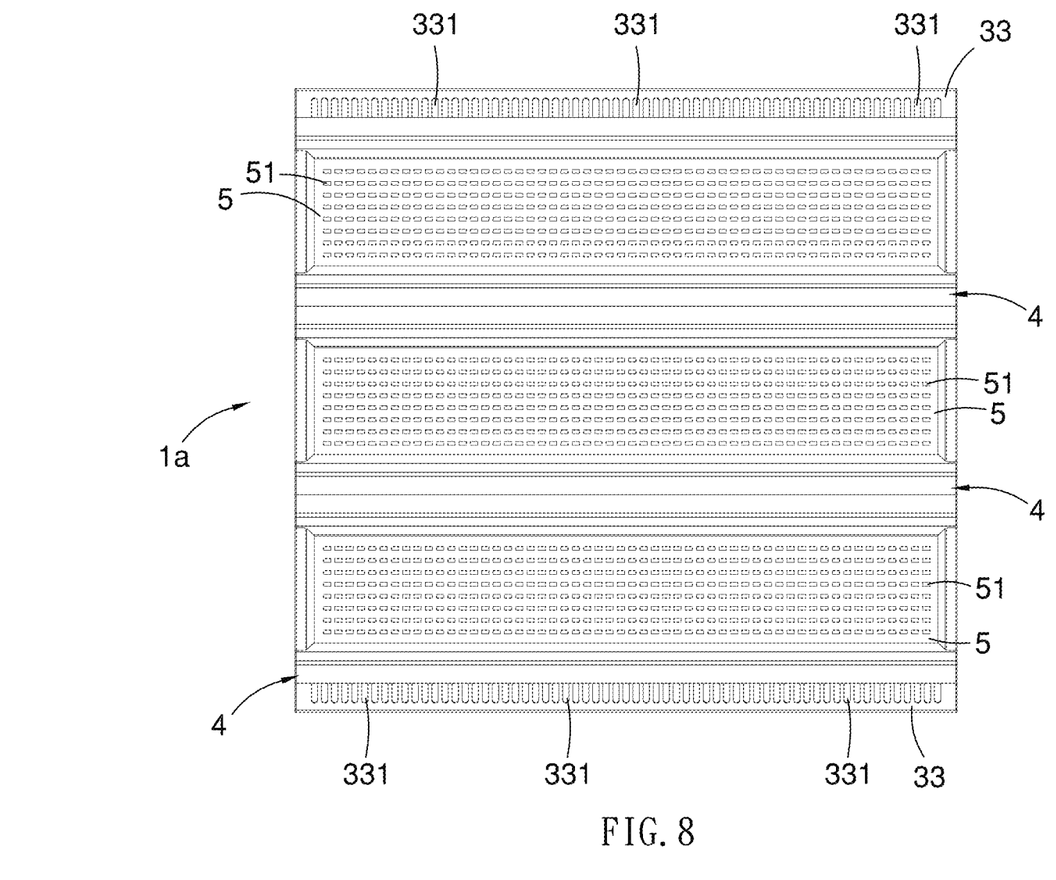
FIG. 8 is a bottom view of the illuminator of FIG. 6.
Figure 9:
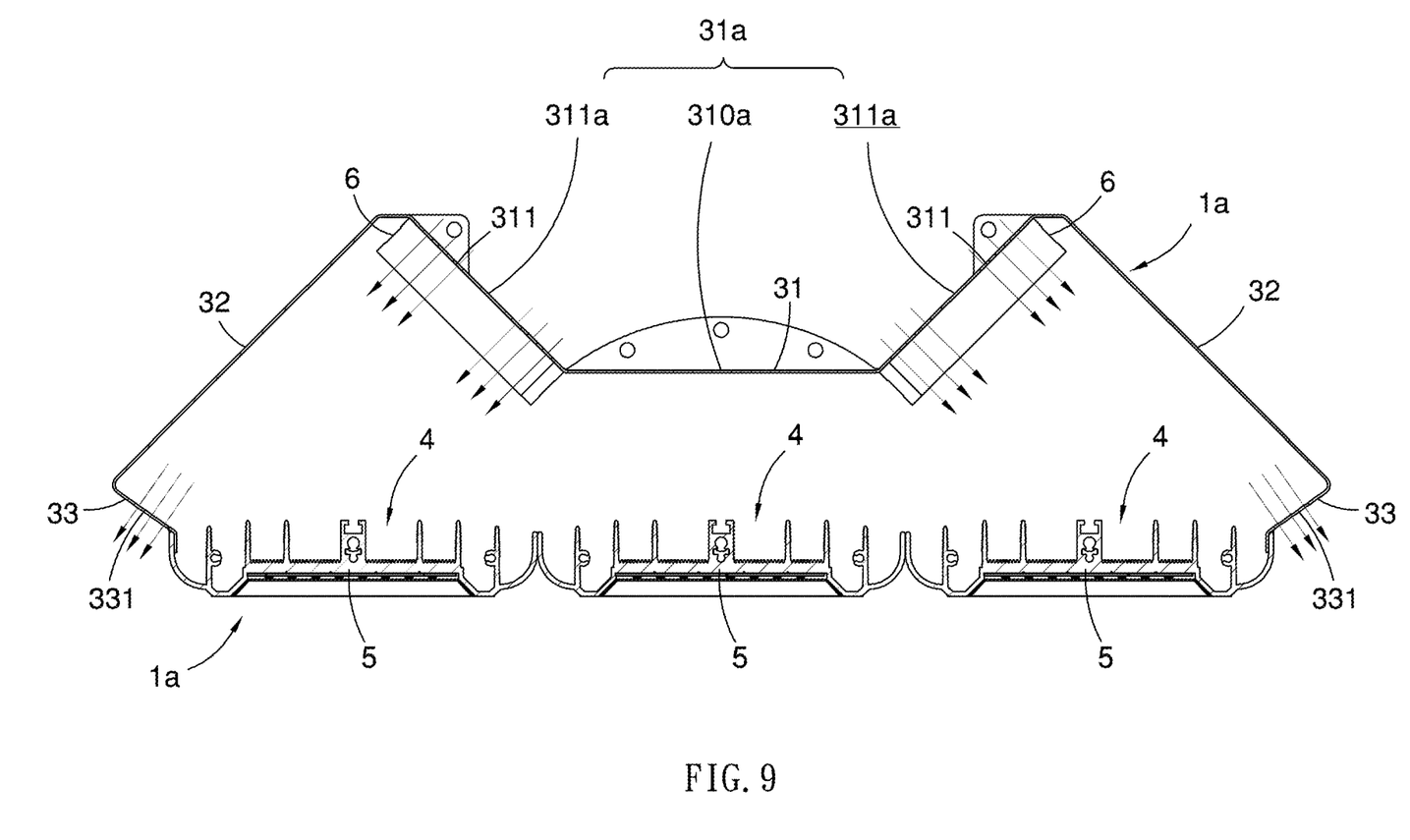
FIG. 9 is a cross-sectional view of the illuminator shown in FIG. 6.

Referring to FIGS. 2 and 5, the lower shell 4 is made of thermally conductive metal. The lower shell 4 includes a substrate 41, two wings 42 and primary radiator fins 43. The substrate 41 includes radiator ribs 44 extending from an upper face. Each of the radiator ribs 44 extends along a length of the substrate 41. The wings 42 are arched elements extending from two opposite edges of the substrate 41. The substrate 41 and the wings 42 together provide a space 420 below the substrate 41. The wings 42 are connected to the extensive portions 34. The primary radiator fins 43 extend from the upper face of the substrate 41 between the wings 42. The primary radiator fins 43 extend parallel to a length of the substrate 41. Each of the primary radiators 43 includes secondary radiator fins 45. Each of the secondary radiator fins 45 extends a length of the corresponding primary radiator fin 43.

Referring to FIGS. 2 and 3, the LED array 5 is connected to a lower face of the substrate 41 by buckles or screws for example. The LED array 5 includes light-emitting diodes 51. The light-emitting diodes 51 can be light-emitting diodes for illumination, light-emitting diodes for promoting the growth of plants or any other proper light-emitting diodes. The LED array 50 is inserted in the space 420.

Referring to FIG. 2, the lower shell 4 is used as a radiator for the LED array 5 so that the lower shell 4 radiates heat from the LED array 5 in operation. The fans 6 are actuated to propel wind into the housing 1 through the entrances 311 and out of the housing 1 via the vents 331 of the outlet portions 33 as indicated by an arrow head. The wind sweeps over the primary radiator fins 43 to expedite the radiation by the primary radiator fins 43 and dissipate heat to the exterior of the housing from the interior of the housing 1. Thus, the heat is efficiently dissipated from the housing 1. Accordingly, the heat is efficiently dissipated from the LED array 5 and the temperature of the LED array 5 is kept a low value. Thus, the life of the LED array is long. Moreover, the illuminator can be located above a plant. Now, the vents 331 of the outlet portions 33 direct the heat toward the plant. Thus, the plant is heated and protected from a cold front. In addition, the growth of the plant is promoted.

Referring to FIGS. 2 and 4, the lower shell 4 further includes a track 46 extending from the upper face. The track 46 extends along a length of the substrate 41. The track 46 includes a groove 461. The groove 461 is used to contain a wire.

In the first embodiment, screws are used to connect the lateral plates 2 to the upper shell 3 and the lower shell 4 to form the tubular structure 10. The upper shell 3 includes screw holes 23 to receive the screws. One of the lateral plates 2 includes apertures 24, 25 and 26 to receive a switch, an input socket and an output socket. However, some of the apertures 24, 25 and 26 can be made in one of the lateral plates 2 and the remaining one(s) of the apertures 24, 25 and 26 is made in the remaining lateral plates 2.

Referring to FIGS. 6 through 9, there is an illuminator according to a second embodiment of the present invention. The second embodiment is like the first embodiment except for a few things. Firstly, it includes a housing 1a in a different shape from the shape of the housing 1. Secondly, it includes several lower shells 4 and several LED arrays 5 instead of only one lower shell 4 and LED array 5. Thirdly, the housing 1a includes an upper shell 3a instead of the upper shell 3. The shell 3a includes an inlet portion 31a instead of the inlet portion 31. The inlet portion 31a includes an intermediate section 310a formed between two lateral sections 311a. The lateral sections 311a extend upward and outward from two opposite edges of the intermediate section 310a. One of the connective portions 32 extends from one of the lateral sections 311a of the inlet portion 31a. The remaining one of the connective portions 32 extends from the remaining one of the lateral sections 311a of the inlet portion 31a. Each of the lateral sections 311a includes at least one entrance 311 to contain at least one fan 6.

The present invention has been described via the illustration of the embodiments. Those skilled in the art can derive variations from the embodiments without departing from the scope of the present invention. Therefore, the embodiments shall not limit the scope of the present invention defined in the claims.

The invention claimed is:
1. An illuminator comprising:
   an upper shell comprising:
      an inlet portion comprising two opposite edges and at least one entrance locating between the edges;
      a first connective portion extending downward from one edge of the inlet portion so that an angle is formed in-between the first connective portion and the inlet portion;
      a second connective portion extending downward from another edge of the inlet portion so that an angle is formed in-between the second connective portion and the inlet portion;
      a first outlet portion extending downward and inward from a lower edge of the first connective portion so that an angle is formed in-between the first outlet portion and the first connective portion, the first outlet portion comprising a row of vents facing downward;
      a second outlet portion extending downward and inward from a lower edge of the second connective portion so that an angle is formed in-between the second outlet portion and the second connective portion;
   a lower shell connected to the upper shell to form a tubular structure, made of thermally conductive metal, and comprising:
      a substrate formed with an upper face and a lower face; and
      primary radiator fins extending from the upper face of the substrate;
   an LED array connected to the lower face of the substrate and comprising light-emitting diodes; and
   at least one fan inserted in the tubular structure, connected to the inlet portion, and aligned with the at least one entrance,
   wherein the wind is propelled into the upper shell through the at least one entrance of the inlet portion and out of the upper shell via the vents of the first outlet portion when the at least one fan is actuated,
   wherein the upper shell comprises two extensive portions each of which extends from a corresponding one of the first and second outlet portions,
   wherein the lower shell comprises two wings extending from two opposite sides of the substrate and connected to the extensive portions.
2. The illuminator according to claim 1, wherein the substrate and the wings together provide a space to contain the LED array.
3. The illuminator according to claim 2, wherein the lower shell comprises a track extending on the upper face of the substrate and comprising a groove.
4. The illuminator according to claim 1, wherein the lower shell comprises radiator ribs extending on the upper face of the substrate.

5. The illuminator according to claim 4, wherein each of the primary radiator fins comprises secondary radiator fins formed on two opposite sides.

6. The illuminator according to claim 1 wherein the inlet portion comprises an intermediate section and two lateral sections extending upward and outward from two opposite sides of the intermediate section, and each of the connective portions extends between a corresponding one of the first and second outlet portions and a corresponding one of the lateral sections.

7. The illuminator according to claim 6, wherein at least one of the lateral sections comprises at least one entrance aligned with the at least one fan.

8. The illuminator according to claim 1, wherein the second outlet portion comprising a row of vents facing downward.

9. The illuminator according to claim 8, wherein the angle in-between the first connective portion and the inlet portion is an obtuse angle, and the angle in-between the second connective portion and the inlet portion is an obtuse angle.

10. The illuminator according to claim 9, wherein the angle in-between the first outlet portion and the first connective portion is an acute angle, and the angle in-between the second outlet portion and the second connective portion is an acute angle.

11. An illuminator comprising:
an upper shell comprising:
an inlet portion comprising two opposite edges and at least one entrance locating between the edges;
a first connective portion extending downward from one edge of the inlet portion so that an angle is formed in-between the first connective portion and the inlet portion;
a second connective portion extending downward from another edge of the inlet portion so that an angle is formed in-between the second connective portion and the inlet portion;
a first outlet portion extending downward and inward from a lower edge of the first connective portion so that an angle is formed in-between the first outlet portion and the first connective portion, the first outlet portion comprising a row of vents facing downward;
a second outlet portion extending downward and inward from a lower edge of the second connective portion so that an angle is formed in-between the second outlet portion and the second connective portion;
a lower shell connected to the upper shell to form a tubular structure, made of thermally conductive metal, and comprising:
a substrate formed with an upper face and a lower face; and
primary radiator fins extending from the upper face of the substrate;
an LED array connected to the lower face of the substrate and comprising light-emitting diodes; and
at least one fan inserted in the tubular structure, connected to the inlet portion, and aligned with the at least one entrance,
wherein the wind is propelled into the upper shell through the at least one entrance of the inlet portion and out of the upper shell via the vents of the first outlet portion when the at least one fan is actuated,
wherein the inlet portion comprises an intermediate section and two lateral sections extending upward and outward from two opposite sides of the intermediate section, and each of the connective portions extends between a corresponding one of the first and second outlet portions and a corresponding one of the lateral sections.

12. The illuminator according to claim 11, wherein at least one of the lateral sections comprises at least one entrance aligned with the at least one fan.

13. An illuminator comprising:
an upper shell comprising:
an inlet portion comprising two opposite edges and at least one entrance locating between the edges;
a first connective portion extending downward from one edge of the inlet portion so that an angle is formed in-between the first connective portion and the inlet portion;
a second connective portion extending downward from another edge of the inlet portion so that an angle is formed in-between the second connective portion and the inlet portion;
a first outlet portion extending downward and inward from a lower edge of the first connective portion so that an angle is formed in-between the first outlet portion and the first connective portion, the first outlet portion comprising a row of vents facing downward;
a second outlet portion extending downward and inward from a lower edge of the second connective portion so that an angle is formed in-between the second outlet portion and the second connective portion;
a lower shell connected to the upper shell to form a tubular structure, made of thermally conductive metal, and comprising:
a substrate formed with an upper face and a lower face; and
primary radiator fins extending from the upper face of the substrate;
an LED array connected to the lower face of the substrate and comprising light-emitting diodes; and
at least one fan inserted in the tubular structure, connected to the inlet portion, and aligned with the at least one entrance,
wherein the wind is propelled into the upper shell through the at least one entrance of the inlet portion and out of the upper shell via the vents of the first outlet portion when the at least one fan is actuated,
wherein the second outlet portion comprising a row of vents facing downward,
wherein the angle in-between the first connective portion and the inlet portion is an obtuse angle, and the angle in-between the second connective portion and the inlet portion is an obtuse angle.

14. The illuminator according to claim 13, wherein the angle in-between the first outlet portion and the first connective portion is an acute angle, and the angle in-between the second outlet portion and the second connective portion is an acute angle.

* * * * *